United States Patent
Zhan

(10) Patent No.: US 8,384,918 B2
(45) Date of Patent: Feb. 26, 2013

(54) ENFORCING A MINIMUM FONT SIZE

(75) Inventor: Xiaonong Zhan, Foster City, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 12/828,123

(22) Filed: Jun. 30, 2010

(65) Prior Publication Data

US 2012/0002226 A1  Jan. 5, 2012

(51) Int. Cl.
G06F 15/00 (2006.01)

(52) U.S. Cl. ........ 358/1.11; 358/1.2; 358/1.9; 358/1.18; 715/269; 345/467

(58) Field of Classification Search ............... 358/1.11, 358/1.2, 1.19, 1.18; 715/269; 345/467
See application file for complete search history.

(56) References Cited

U.S. PATENT DOCUMENTS

| 6,081,831 A * | 6/2000 | Miura .................. 709/206 |
| 7,517,086 B1 | 4/2009 | Kurkure |
| 7,797,631 B2 * | 9/2010 | Yoshida ............... 715/269 |
| 2008/0062437 A1 * | 3/2008 | Rizzo .................. 358/1.2 |
| 2008/0100624 A1 | 5/2008 | Matsunaga |
| 2008/0225306 A1 * | 9/2008 | Shepherd et al. ...... 358/1.2 |
| 2008/0320386 A1 | 12/2008 | Balzano et al. |

* cited by examiner

Primary Examiner — David K Moore
Assistant Examiner — Mark Milia
(74) Attorney, Agent, or Firm — Osha • Liang LLP

(57) ABSTRACT

A method for enforcing a user specified minimum font size (USMFS) in a hardcopy document (HD). The method includes: receiving a request to print an electronic document (ED) according to a magnification ratio; identifying a first character in the ED having a first font size smaller than a quotient of the USMFS divided by the magnification ratio; and increasing the first font size by a scale factor to match the quotient; where the HD is generated by scaling the ED according to the magnification ratio, and wherein the HD comprises the first character in the USMFS.

19 Claims, 6 Drawing Sheets

Calibration Page 402

*The quick brown fox jumped over the lazy dog.*
*The quick brown fox jumped over the lazy dog.*
*The quick brown fox jumped over the lazy dog.*
*The quick brown fox jumped over the lazy dog.*
*The quick brown fox jumped over the lazy dog.*

10 pts.
Italics Style
120% line spacing

*The quick brown fox jumped over the lazy dog.*
*The quick brown fox jumped over the lazy dog.*
*The quick brown fox jumped over the lazy dog.*
*The quick brown fox jumped over the lazy dog.*
*The quick brown fox jumped over the lazy dog.*

10 pts.
Italics Style
150% line spacing

The quick brown fox jumped over the lazy dog.
The quick brown fox jumped over the lazy dog.
The quick brown fox jumped over the lazy dog.
The quick brown fox jumped over the lazy dog.
The quick brown fox jumped over the lazy dog.

12 pts.
Regular Style
120% line spacing

The quick brown fox jumped over the lazy dog.
The quick brown fox jumped over the lazy dog.
The quick brown fox jumped over the lazy dog.
The quick brown fox jumped over the lazy dog.
The quick brown fox jumped over the lazy dog.

12 pts.
Bold Style
150% line spacing

FIG. 4A

ENFORCING A MINIMUM FONT SIZE

BACKGROUND

Although the demand for printing electronic documents (EDs) is decreasing because of recent improvements in computer displays, there are still those who generate hardcopies of EDs for purposes of reading the EDs. For example, some readers may simply prefer reading a hard copy over staring at a computer screen. In other instances, hardcopies of the EDs may be provided to a group of people at an informal presentation, or in other situations where reading from a projector screen or computer display is not convenient.

Printer drivers offer multiple features/settings for generating hardcopy documents including paper source selection (i.e., tray selection), paper type selection (e.g., plain, transparency, bond, etc.), paper orientation selection (e.g., portrait, landscape), two-sided (i.e., duplex) printing, page scaling (i.e., enlargement or reduction), and N-up printing (i.e., printing N pages of the ED on a single sheet of paper), etc. Depending on the selected printer driver features, the font sizes of one or more characters in the ED may be modified (e.g., increased or reduced).

Accordingly, a hardcopy document may have any number of fonts having any number of font sizes. However, individual users may find some font sizes easier to read than others. In fact, each user may have a preferred minimum font size. In other words, although a user enjoys and frequently invokes the various printing features offered by a printer driver, a user would rather not attempt reading a hardcopy document having font sizes that are smaller than his/her preferred minimum font size.

SUMMARY

In general, in one aspect, the invention relates to a method for enforcing a user specified minimum font size (USMFS) in a hardcopy document (HD). The method comprises: receiving a request to print an electronic document (ED) according to a magnification ratio; identifying a first character in the ED having a first font size smaller than a quotient of the USMFS divided by the magnification ratio; and increasing the first font size to match the quotient; wherein the HD is generated by scaling the ED according to the magnification ratio, and wherein the HD comprises the first character in the USMFS.

In general, in one aspect, the invention relates to a method for enforcing a user specified minimum font size (USMFS) in a hardcopy document (HD). The method comprises: receiving, by a printer, a print job comprising an indication of a magnification ratio and a plurality of page descriptor language (PDL) commands corresponding to an electronic document (ED), wherein the ED comprises a first character having a first font size; replacing, by the printer and within the plurality of PDL commands, the first font size with a quotient of the USMFS divided by the magnification ratio within the plurality of PDL commands, wherein the first font size is smaller than the quotient; and generating, by the printer and based on the plurality of PDL commands, the HD by scaling the ED according to the magnification ratio, wherein the HD comprises the first character in the USMFS.

In general, in one aspect, the invention relates to a computer readable storage medium storing instructions for enforcing a user specified minimum font size (USMFS) in a hardcopy document (HD). The instructions comprising functionality to: receive a request to print an electronic document (ED) according to a magnification ratio; identify a first character in the ED having a first font size smaller than a quotient of the USMFS divided by the magnification ratio; and increase the first font size to match the quotient; wherein the HD is generated by scaling the ED according to the magnification ratio, and wherein the HD comprises the first character in the USMFS.

In general, in one aspect, the invention relates to a system for enforcing a user specified minimum font size (USMFS) in a hardcopy document (HD). The system comprises enforcing a user specified minimum font size (USMFS) in a hardcopy document (HD), comprising: a hardware processor; a memory operatively connected to the hardware processor; and a plurality of instructions stored within the memory and comprising functionality to: receive a request to print an electronic document (ED) according to a magnification ratio; identify a first character in the ED having a first font size smaller than a quotient of the USMFS divided by the magnification ratio; and increase the first font size to match the quotient; wherein the HD is generated by scaling the ED according to the magnification ratio, and wherein the HD comprises the first character in the USMFS.

Other aspects of the invention will be apparent from the following description and the appended claims.

BRIEF DESCRIPTION OF DRAWINGS

FIGS. 4A and 4B show examples in accordance with one or more embodiments of the invention.

DETAILED DESCRIPTION

Figure 1:
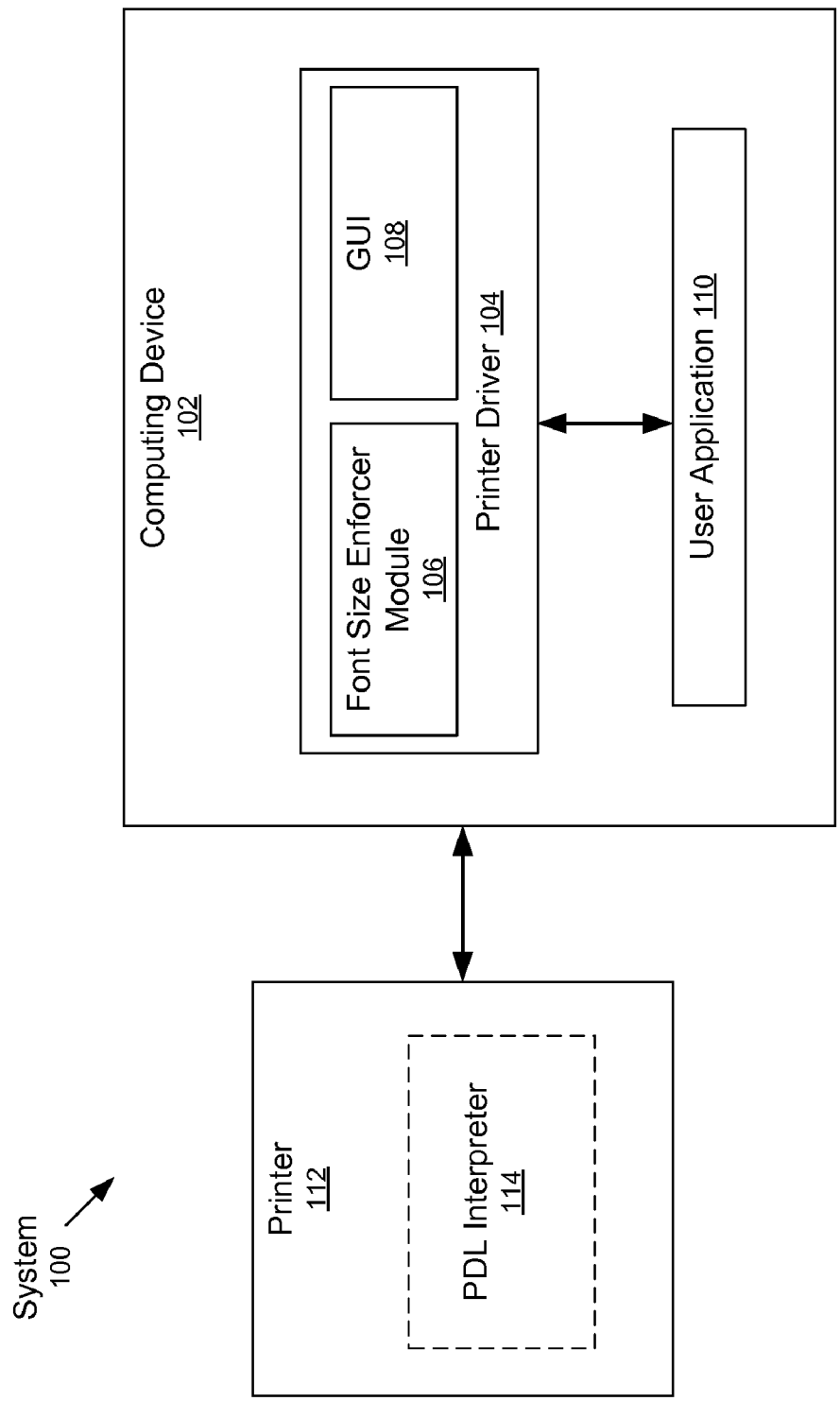
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a system and method for enforcing a user specified minimum font size (USMFS) when generating a hardcopy document from an ED. Accordingly, even though an ED is printed using an N-up printing feature or other printing feature having a magnification ratio, the font size(s) in the resulting hardcopy document equal or exceed the USMFS.

FIG. 1 shows a system (100) in accordance with one or more embodiments of the invention. As shown in FIG. 1, the system (100) has multiple components including a printer (112) and a computing device (102). The printer (112) may include a page descriptor language (PDL) interpreter (114). The printer (112) may be an inkjet printer, a laser printer, a liquid crystal display (LCD) printer or light emitting diode (LED) printer, a dot-matrix printer, a dye sublimation printer, a solid ink printer, a plotter, a three-dimensional (3D) printer, etc. The computing device (102) may include a printer driver (104) and a user application (110). The computing device (102) may be a personal computer (PC), a desktop computer, a mainframe, a server, a telephone, a kiosk, a cable box, a personal digital assistant (PDA), a mobile phone, a smart phone, etc. There may be a direct connection (e.g., universal serial bus (USB) connection) between the computing device (102) and the printer (112). In one or more embodiments of the invention, the printer (112) is part of a photocopier (not shown). In one or more embodiments of the invention, the printer (112) and the computing device (102) are part of a photocopier (not shown). Alternatively, the connection linking the computing device (102) and the printer (112) may correspond to a network having wired and/or wireless segments.

In one or more embodiments of the invention, the computing device (102) executes the user application (110). The user application (110) is a software application operated by a user and configured to obtain, input, generate, and/or print EDs. Accordingly, the user application (110) may be a word-processing application, a spreadsheet application, a desktop publishing application, a graphics application, a photograph printing application, an Internet browser, etc. The user application (110) may generate new documents, obtain previously saved EDs, and/or input pages from a document scanner (not shown). Each ED generated, obtained, and/or inputted by the user application (110) may include one or more text blocks and/or one or more images.

In one or more embodiments of the invention, a font size is defined by a typeface (e.g., Arial, Times New Roman, Courier, etc.), a size (e.g., 8 pts., 10 pts., 12 pts., etc.), a style (i.e., bold, italics, underline, etc.), and a line spacing (e.g., 120%, 140%, etc.). Each text block within the ED may have characters of one or more font sizes. A text block may be of any shape and occupy any portion, including the entire width and/or the entire height, of a page in the ED. Moreover, a text block may be split across multiple pages within the ED.

In one or more embodiments of the invention, the ED is represented using a document markup language (e.g., XML, OOXML, etc.). The font sizes in the ED may be recorded as attributes within the tags of the document markup language.

In one or more embodiments of the invention, the printer driver (104) is software operatively connected to the printer (112) and configured to convert the data in the document to a specific format required by the printer (112). For example, in the case of page descriptor language (PDL) printing schemes, the printer driver (104) generates a print job described in PDL based on the ED content and selected printing options. The PDL commands/instructions include various print objects (e.g., text objects, graphic objects, image objects) and control objects (e.g., blend and transparency commands, color management information) to describe the page for printing. As another example, in the case of raster printing, the printer driver (104) generates page images (i.e., rasterized image data such as bitmap data) based on the ED content and the printing options, and sends the page images to the printer (112).

In one or more embodiments of the invention, the printer driver (104) offers multiple features/settings for printing EDs including paper source selection (i.e., tray selection), paper type selection (e.g., plain, transparency, bond, etc.), paper orientation selection (e.g., portrait, landscape), two-sided (i.e., duplex) printing, page scaling (i.e., enlargement or reduction), and N-up printing (i.e., printing N pages of the ED on a single sheet of paper), etc. Depending on the selected printer driver features, the pages of the ED and thus the font sizes of one or more characters in the ED may be scaled (e.g., increased, decreased) by a magnification ratio (MR). For example, in the case of the 2-up printing feature, the font sizes are scaled by a magnification ratio of 0.707. Those skilled in the art, having the benefit of this detailed description, will appreciate that the magnification ratio may take on any value (e.g., 0.75, 1.00, 2.25, etc.). Further, different pages in the ED may have different MRs.

In one or more embodiments of the invention, the font size enforcer (FSE) module (106) is configured to modify (i.e., increase and/or decrease) font sizes. Specifically, following a request to print an ED, the FSE module (106) may increase font sizes within the ED to ensure that all font sizes in the resulting hardcopy document are at least the size of a USMFS (discussed below). In one or more embodiments of the invention, the FSE module (106) is located on the printer (112) (e.g., as part of the PDL Interpreter (114)).

In one or more embodiments of the invention, when the ED includes multiple font sizes that are smaller than the USMFS, the FSE module (106) may increase the smallest font size in the ED to match the quotient of USMFS/MR. The remaining font sizes among the font sizes smaller than the quotient may be increased/scaled by: (1) adding a difference between the quotient and the smallest font size in the document to the remaining font sizes; or (2) calculating a scale factor by dividing the quotient with the first font size, and then multiplying the scale factor with the remaining font sizes. Alternately, all the font sizes smaller than the USMFS may be increased to the quotient uniformly. Font sizes in the ED that exceed the quotient may be maintained, or may also be increased or scaled using the scale factor. Those skilled in the art, having the benefit of this detailed description, will appreciate that by increasing all font sizes in the ED (i.e., not just font sizes smaller than the USMFS), the form/layout of the hardcopy document will better resemble the form/layout of the ED.

In one or more embodiments of the invention, the FSE module (106) parses the tags and attributes in the markup of the ED and replaces the font sizes with the modified font sizes (i.e., before a PDL printing scheme or raster printing scheme is used to print the ED). In one or more embodiments of the invention, the FSE module (106) parses PDL commands/instructions and replaces the font sizes with the modified font sizes. Alternatively, the FSE module (106) may issue an instruction to the printer (112) (i.e., as part of a print job) to perform the mentioned parsing and replacing.

In one or more embodiments of the invention, the printer (112) generates hardcopy documents from incoming print jobs. In the case of PDL printing schemes (discussed above), the print jobs may include the ED, instructions regarding the selected printing feature(s) (e.g., N-up printing) associated with one or more MRs, and/or the USMFS. The PDL interpreter (114) interprets the PDL commands/instructions to generate page images by scaling the ED according to the MR (i.e., the printer (112) rasterizes the objects). The page images are then printed on a physical medium (e.g., paper, microfiche, microfilm, etc.). In the case of raster printing (discussed above), the printer (112) receives the actual page images (i.e., the ED is already scaled) and then prints them on the physical medium.

In one or more embodiments of the invention, the GUI (108) comprises a number of widgets (i.e., checkboxes, radio buttons, buttons, textboxes, drop-down lists, etc.) corresponding to a number of printing options. A user may select one or more of the printing options by manipulating the appropriate widget(s). Accordingly, the GUI (108) is effectively used by the computing device (102) to collect selections/input made by the user. Further, any selections collected using the GUI (108) may be packaged as a PDL commands/instructions by the printer driver (104) and sent to the printer (112).

Figure 2:
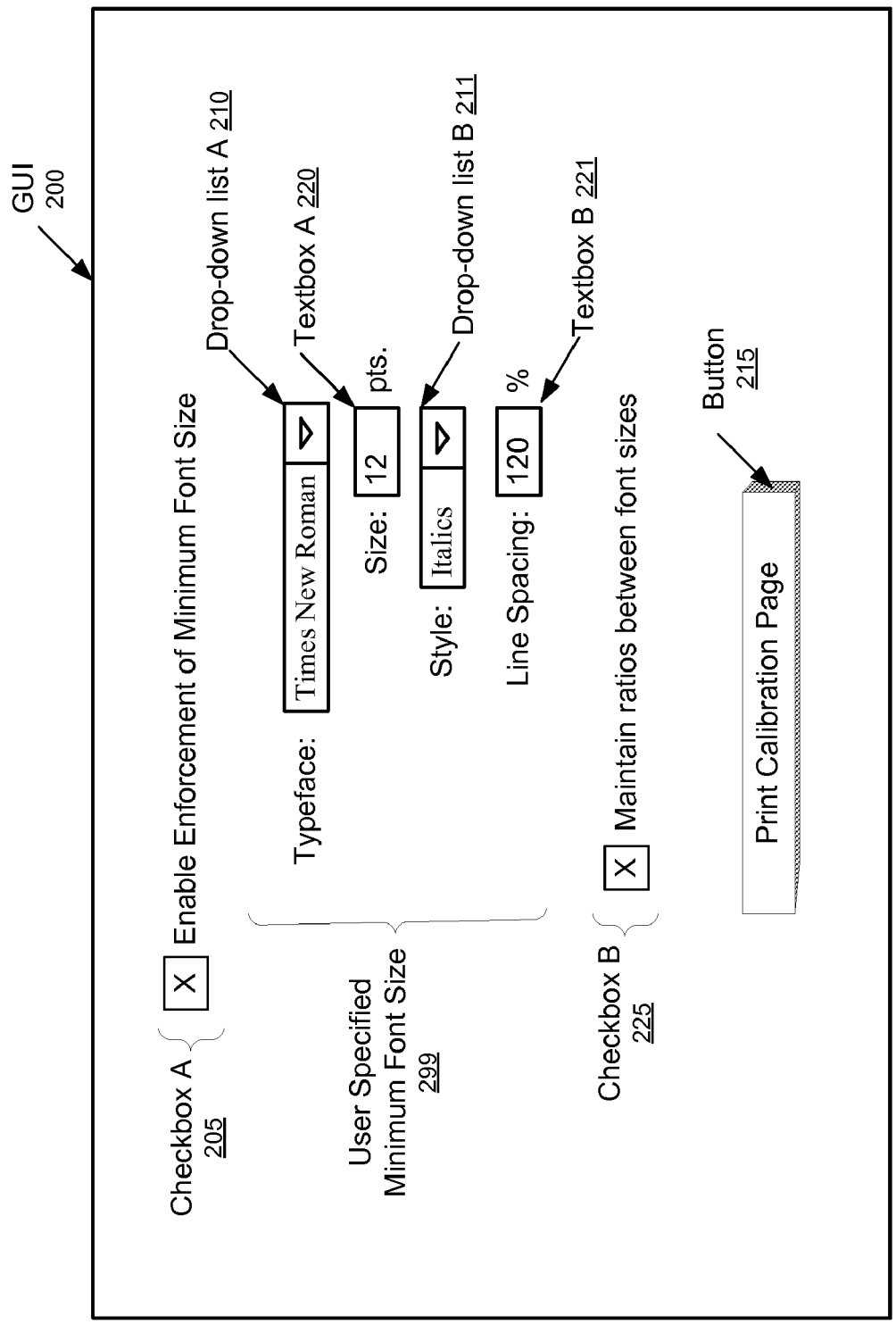
FIG. 2 shows a graphical user interface (GUI) in accordance with one or more embodiments of the invention.

FIG. 2 shows a GUI (200) in accordance with one or more embodiments of the invention. The GUI (200) is an example of the GUI (108), discussed above in reference to FIG. 1. As shown in FIG. 2, the GUI comprises multiple widgets (i.e., Checkbox A (205), Checkbox B (225), Button (215), Drop-Down List A (210), Drop-Down List B (211), Textbox A (220), and Textbox B (221)). Those skilled in the art, having the benefit of this detailed description, will appreciate that the GUI (200) may have additional widgets not shown in FIG. 2 (e.g., a button to preview the hardcopy version of the ED).

In one or more embodiments of the invention, the user enables minimum font size enforcement by selecting the check box A (205), selecting a typeface from the drop-down list A (210), inputting a size into the textbox A (220), specifying a style from the drop-down list B (211), and/or inputting a line spacing into the textbox B (221). Specifically, the USMFS (299) is defined by the drop-down lists (210, 211) and the textboxes (220, 221). In one or more embodiments of the invention, one or more of the widgets (210, 211, 220, 221) are fixed. Accordingly, in such embodiments, the user can only specify the minimum font size by manipulating the remaining (i.e., non-fixed) widgets. As shown in FIG. 2, the user has selected the typeface "Times New Roman," a size of 12 pts., the italics style, and a line spacing of 120% as the USMFS.

In one or more embodiments of the invention, the user enables the option to maintain the ratios between font sizes by selecting the checkbox B (225). As a result of selecting the checkbox B (225), even font sizes in the ED equaling or exceeding the quotient of the USMFS/MR will be increased (i.e., by the scale factor). As discussed above, by increasing all font sizes in the ED (i.e., not just font sizes smaller than the USMFS), the form/layout of the hardcopy document will better resemble the form/layout of the ED.

In one or more embodiments of the invention, the user prints (or displays) a print calibration page by selecting the button (215). The calibration page comprises multiple instances of a test string (e.g., the sentence "The quick brown fox jumped over the lazy dog" repeated multiple times) printed in the typeface (i.e., the typeface selected using the drop-down list A (210)), but with each instance having a different font size. Labels are also printed on the calibration page explicitly indicating the various font sizes. The user may study the calibration page to determine a desired minimum font size. The user may then enter the desired minimum font size using the widgets (210, 211, 220, 221).

Figure 3:
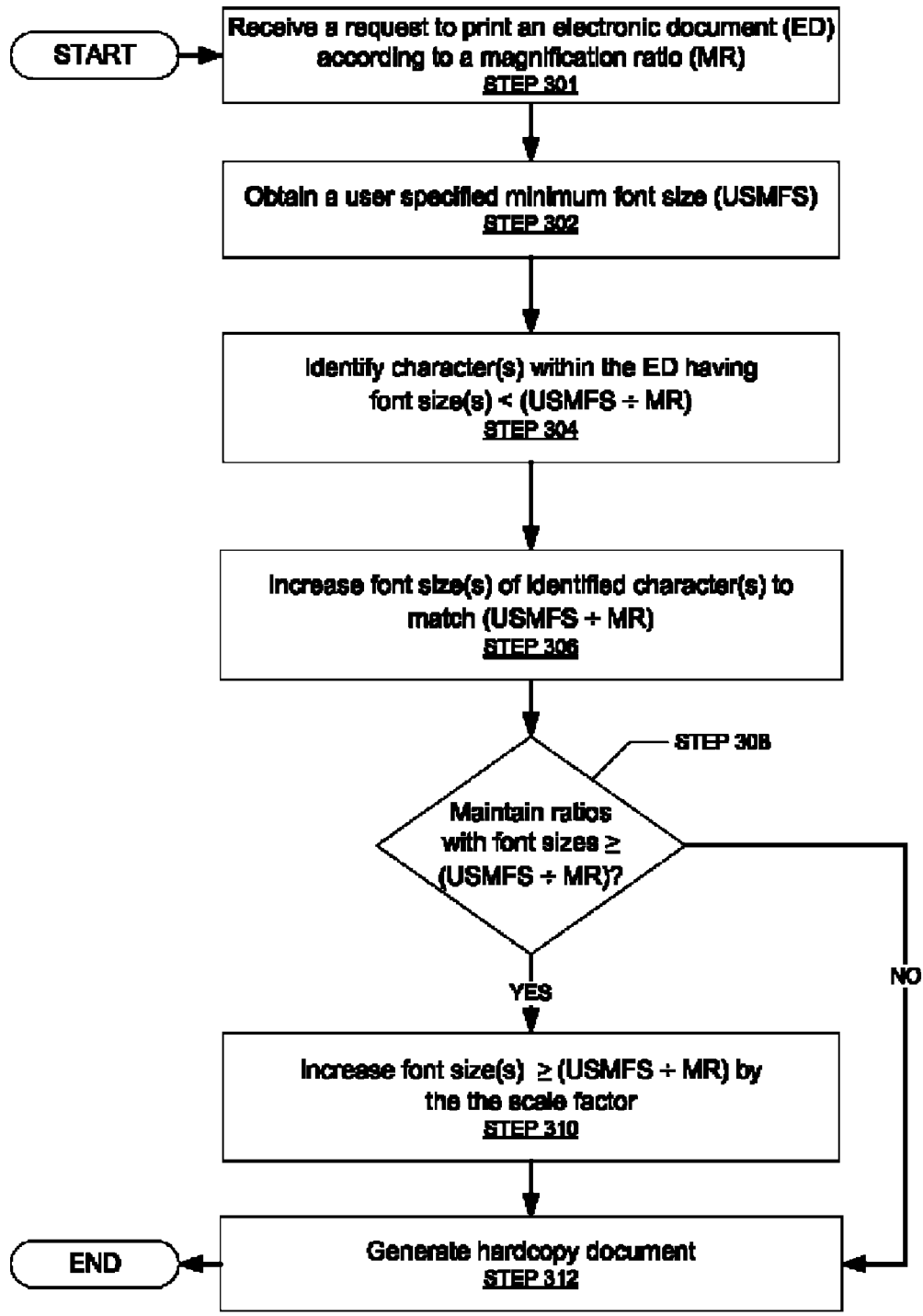
FIG. 3 shows a flowchart in accordance with one or more embodiments of the invention.

FIG. 3 shows a flowchart in accordance with one or more embodiments of the invention. The process depicted in FIG. 3 may be implemented using the system (100), described above in reference to FIG. 1. For example, the steps in FIG. 3 may be implemented by the printer driver (104) and/or the printer (112). One or more steps shown in FIG. 3 may be omitted, repeated, and/or performed in a different order among different embodiments of the invention. Accordingly, embodiments of the invention should not be considered limited to the specific number and arrangement of steps shown in FIG. 3.

Initially, a request to print an ED according to a MR is received (STEP 301). As discussed above, the ED may include any number of pages having one or more text blocks with characters of different font sizes. A text block may be of any shape and occupy any portion, including the entire width and/or the entire height, of a page in the ED. Moreover, a text block may be split across multiple pages within the ED.

As also discussed above, the printer driver (104) offers multiple features/settings for printing the ED including paper source selection (i.e., tray selection), paper type selection (e.g., plain, transparency, bond, etc.), paper orientation selection (e.g., portrait, landscape), two-sided (i.e., duplex) printing, page scaling (i.e., enlargement or reduction), and N-up printing (i.e., printing N pages of the ED on a single sheet of paper), etc. The MR may correspond to a printing feature (e.g., N-up printing) which requires scaling the ED and thus the font sizes in the ED. For example, in the case of the 2-up printing feature, the MR=0.707.

In STEP 302, a USMFS is obtained. In one or more embodiments of the invention, the USMFS is collected from a GUI (e.g., GUI (200)). Specifically, the user manipulates the widgets of the GUI to select/input a typeface, a size, a style, and a line spacing defining the USMFS. In one or more embodiments of the invention, a calibration page is generated for the user comprising multiple instances of a test string. The multiple test strings have the same typeface but each instance is of a different size, style, and/or line spacing. The calibration page serves as a visual aid to the user in order to select/input the desired minimum font size using the GUI. Alternatively, the USMFS may be selected from a file created by the user, the manufacturer of the printer driver, and/or a third party.

In STEP 304, the characters within the ED having font sizes smaller than the quotient of USMFS/MR are identified. In one or more embodiments of the invention, identification of these smaller font sizes is accomplished by parsing the attributes in the markup representation (e.g., XML, OOXML, etc.) of the ED. In one or more embodiments of the invention, identification of these smaller font sizes is accomplished by parsing the PDL commands/instructions (i.e., in a PDL printing scheme) corresponding to the ED. The parsing may be performed by a printer driver (i.e., Printer Driver (104)), discussed above in reference to FIG. 1. Alternatively, the parsing may be performed by a printer (i.e., Printer (112), also discussed above in reference to FIG. 1).

In STEP 306, the font sizes of the identified characters are increased. Accordingly, STEP 306 may include calculating a difference between the quotient and the smallest font size identified within the ED. The difference may then be added to all of the identified font sizes to generate the modified font sizes. Alternatively, STEP 306 may include calculating a scale factor by dividing the quotient by the smallest font size identified within the ED. The scale factor may then be multiplied with all of the identified font sizes to obtain the modified font sizes. As yet another alternative, all font sizes smaller than the quotient are increased uniformly to match the quotient.

In one or more embodiments of the invention, STEP 306 includes replacing the small font sizes in the tags of the markup representation (i.e., XML, OOXML, etc.) with the modified font sizes. In one or more embodiments of the invention, STEP 306 includes replacing the small font sizes in the PDL commands/instructions with the modified font sizes. By increasing the font sizes, the text blocks including the identified characters also increase. The larger text blocks may need to be repositioned on the page, pushed onto a new page, split between multiple pages, etc. Further, other text blocks on the page which do not include the identified characters may need to be repositioned to accommodate the expanded text blocks.

Those skilled in the art, having the benefit of this detailed description, will appreciate that STEP 304 and STEP 306 are executed in response to the user enabling (i.e., selecting using a GUI) the enforce minimum font size option, discussed above in reference to FIG.

In STEP 308, it is determined whether the user has enabled/invoked the maintain ratios between font sizes option. As discussed above in reference to FIG. 2, the mentioned option may be selected by the user from a GUI (i.e., GUI (200)). When it is determined that the user invoked the maintain ratios between font sizes option, the process proceeds to STEP 310. Otherwise, the process proceeds to STEP 312.

In STEP 310, characters within the ED having font sizes equaling or exceeding the quotient are identified. In one or more embodiments of the invention, identification of these larger font sizes is accomplished by parsing the attributes of the markup representation (e.g., XML, OOXML, etc.) of the ED. In one or more embodiments of the invention, identification of these larger font sizes is accomplished by parsing the PDL commands/instructions (i.e., in a PDL printing scheme) corresponding to the ED. The parsing may be performed by a printer driver (i.e., Printer Driver (104)), discussed above in reference to FIG. 1. Alternatively, the parsing may be performed by a printer (i.e., Printer (112)), also discussed above in reference to FIG. 1.

Further, once identified, the larger font sizes may be increased or scaled according to the scale factor (from STEP 306). Specifically, the difference may be added to the larger font sizes to generate the modified font sizes. Alternatively, the scale factor may be multiplied with the larger font sizes to generate the modified font sizes. In one or more embodiments of the invention, STEP 310 includes replacing the large font sizes in the tags of the markup representation (i.e., XML, OOXML, etc.) with the modified (i.e., even larger) font sizes. In one or more embodiments of the invention, STEP 310 includes replacing the large font sizes in the PDL commands/instructions with the modified (i.e., even larger) font sizes. As discussed above, by increasing the font sizes, the text blocks having the identified characters will increase. Accordingly, it may be necessary to reposition text blocks in order to accommodate the larger font sizes.

Those skilled in the art, having the benefit of this detailed description, will appreciate that STEP 308 may be executed at the beginning of the process shown in FIG. 3. In such embodiments, STEPS 304, 306, and 310 may be combined such that the larger font sizes and the smaller font sizes within the ED are identified during a single parsing session.

In STEP 312, a hardcopy document corresponding to the ED is generated by a printer (e.g., Printer (112)). In one or more embodiments of the invention, STEP 312 includes scaling, by a printer, the pages of the ED described by PDL print commands according to the selected printing feature (e.g., N-up printing). The resulting page images (e.g., pages of the ED scaled by the MR and organized into groups of N pages per sheet) are outputted onto a physical medium. Alternatively, in the case of raster printers, the printer receives page images which have already been scaled (e.g., by the printer driver), and outputs the page images onto the physical medium.

If STEP 312 is executed immediately following STEP 310, all font sizes in the ED will have been increased, including font sizes that were originally equal to or greater than the quotient. However, if STEP 312 is executed immediately following STEP 308, only font sizes in the ED that were smaller than the quotient will have been increased. The font sizes that were originally equal to or greater than the quotient may remain unchanged.

FIG. 4A shows an example in accordance with one or more embodiments of the invention. Specifically, FIG. 4A shows a calibration page (402). As shown in FIG. 4A, the calibration page (402) has multiple instances of the same test string. Further, each instance of the test string is in the Times New Roman typeface. However, no two instances of the test string have the same font size. As discussed above, a user may consult the calibration page (402) to identify a suitable minimum font size.

Figure 4B:
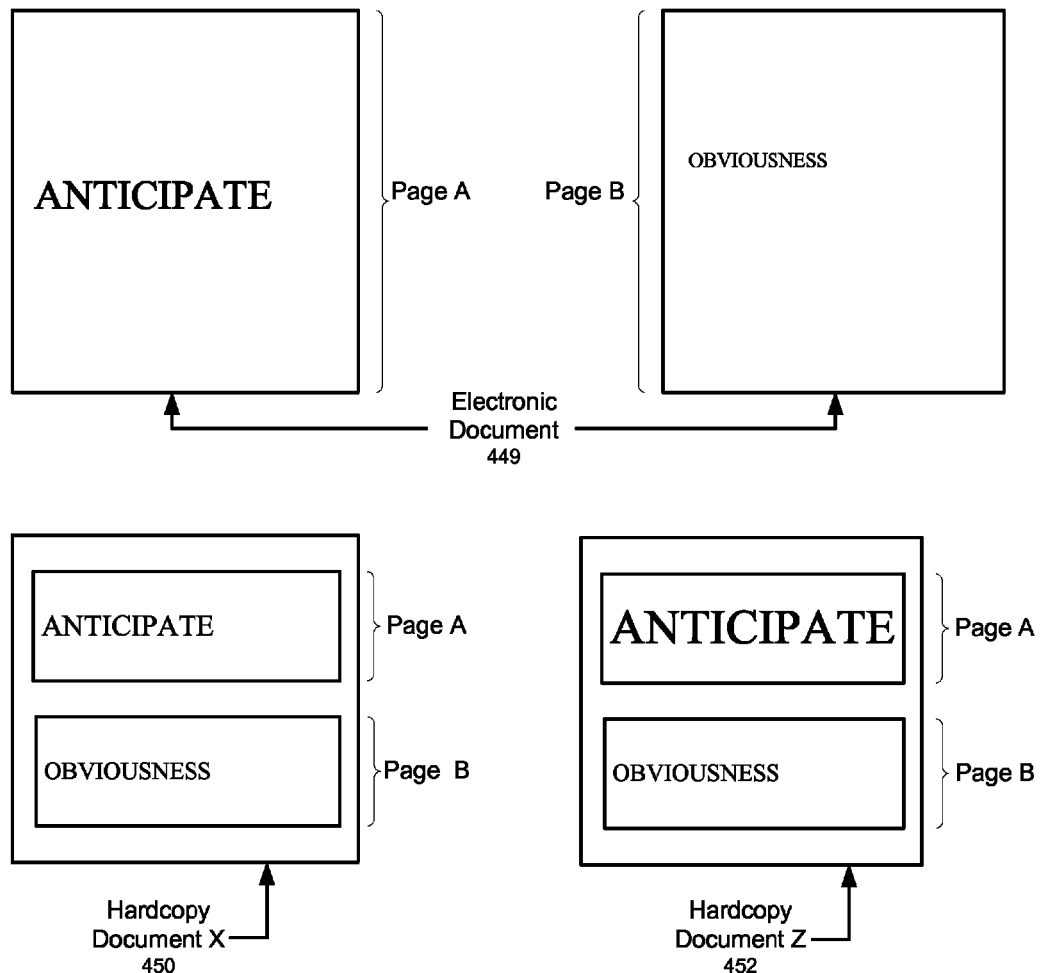

FIG. 4B shows an example in accordance with one or more embodiments of the invention. As shown in FIG. 4B, the ED (449) includes the page A and the page B. Page A has characters with a Times New Roman typeface, a size of 20 pts., a regular style, and 120% line spacing. In contrast, Page B has characters with a Times New Roman typeface, a size of 10 pts., a regular style, and 120% line spacing.

Consider the following set of assumptions: (i) the USMFS is a Times New Roman typeface of size 12 pts. with regular style and 120% line spacing; (ii) the user has selected to not maintain font size ratios (i.e., STEP 308 in FIG. 3 is "FALSE"); and (iii) the user desires to print the ED (449) using the 2-up printing feature. Accordingly, the MR=0.707 and the quotient=USMFS/MR≈17 pts.

The characters in page A of the ED (449) have a font size exceeding the quotient (i.e., 20 pts.>17 pts.). Accordingly, the font size of the characters in page A do not need to be increased before the ED (449) is scaled to implement the 2-up printing feature. Thus, the characters of page A will appear as approx. 14 pts. (i.e., 20 pts.×0.707≈14 pts.) in the hardcopy document X (450), which exceeds the USMFS.

However, the characters in page B of the ED (449) have a font size that is smaller than the quotient (i.e., 10 pts.<17 pts.). Accordingly, the font size of the characters in page B will be increased to match the quotient (i.e., 17 pts) before the ED (449) is scaled to implement the 2-up printing feature. Thus, the characters of page B will appear as approx. 12 pts. (i.e. 17 pts.×0.707≈12 pts.) in the hardcopy document X (450), which satisfies the USMFS.

Now consider a different set of assumptions: (i) the USMFS is a Times New Roman typeface of size 12 pts. with regular style and 120% line spacing; (ii) the user has selected to maintain font size ratios (i.e., STEP 308 in FIG. 3 is "TRUE"); and (iii) the user desires to print the ED (449) using the 2-up printing feature. Accordingly, the MR=0.707 and the quotient=USMFS/MR≈17 pts.

The characters in page B of the ED (449) have a font size that is smaller than the quotient (i.e., 10 pts.<17 pts.). Accordingly, the font size of the characters in page B will be increased to match the quotient (i.e., 17 pts) before the ED (449) is scaled to implement the 2-up printing feature. Thus, the characters of page B will appear as approx. 12 pts. (i.e. 17 pts.×0.707≈12 pts.) in the hardcopy document Z (452), which satisfies the USMFS. More importantly, the scale factor=quotient/font size of characters in page B=17 pts./10 pts.=1.7.

The characters in page A of the ED (449) have a font size exceeding the quotient (i.e., 20 pts.>17 pts.). Regardless, the user has requested to maintain font size ratios. Accordingly, the font size of the characters in page A is increased by the scale factor before the ED (449) is scaled to implement the 2-up printing feature. Specifically, the font size of the characters in page A is scaled to 34 pts. (i.e., 34 pts.=20 pts.×scale factor=20 pts.×1.7). Thus, the characters of page A will appear as approx. 24 pts. (i.e., 34 pts.×0.707≈24 pts.) in the hardcopy document Z (452), which is greater than the USMFS.

As shown in FIG. 4B, although both the hardcopy X (450) and the hardcopy Z (452) resemble the ED (449), and although all fonts in both the hardcopy X (450) and the hardcopy Z (452) satisfy the USMFS, the hardcopy Z (452) more closely resembles the form/layout of the ED (449) because the user selected to maintain font size ratios.

Embodiment of the invention may have one or more of the following advantages: the ability to set the minimum font size appearing in a hardcopy document even when one or more formatting features of the printer driver are invoked; the ability to maintain ratios between the original font sizes when increasing font sizes for a hardcopy document; the ability to conserve paper and energy by not printing multiple hardcopy documents of different font sizes until a comfortable minimum font size is identified; the ability to increase some font sizes but not other font sizes when generating a hardcopy document from an ED having multiple font sizes, etc.

Figure 5:
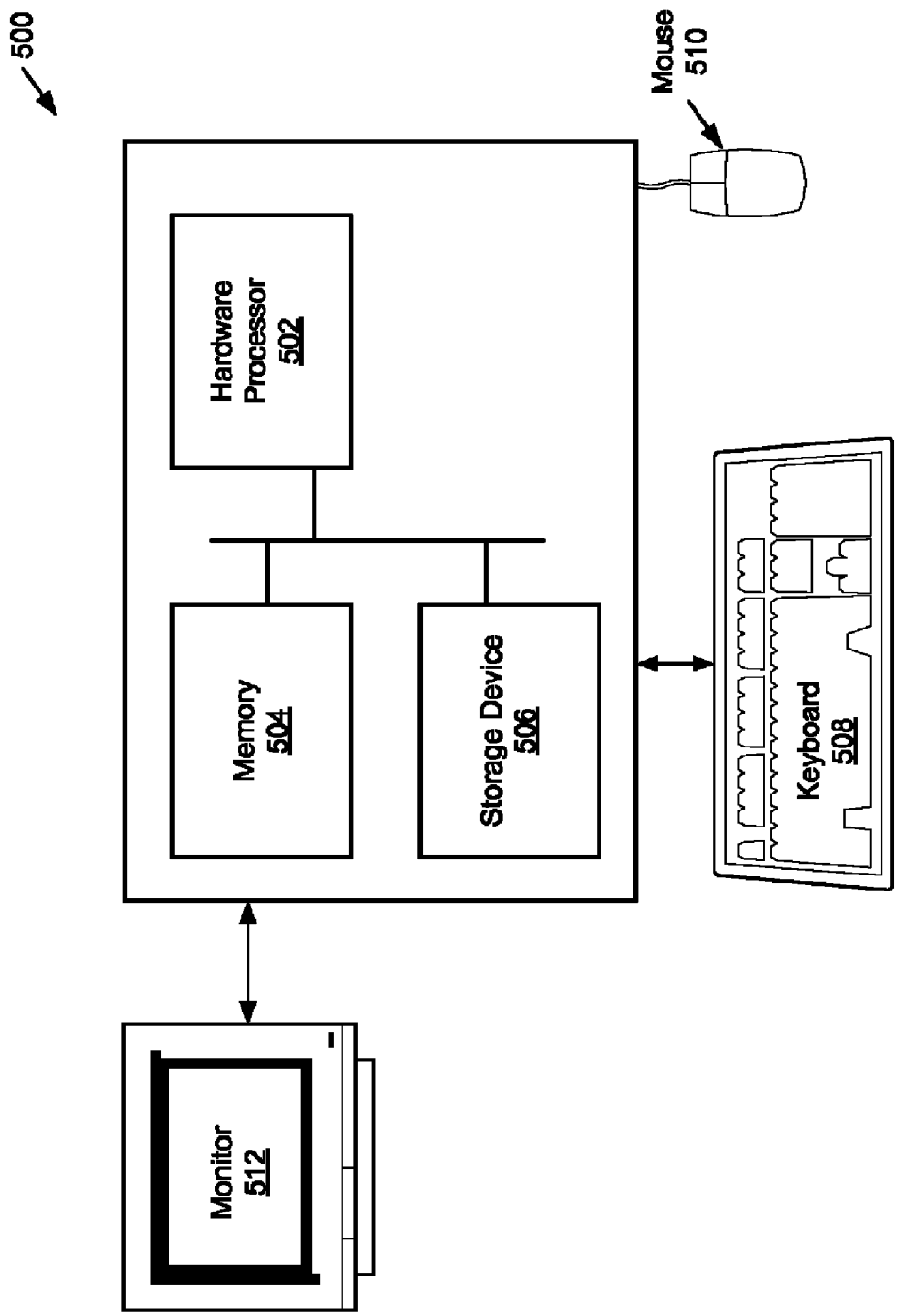
FIG. 5 shows a computer system in accordance with one or more embodiments of the invention.

Embodiments of the invention may be implemented on virtually any type of computer regardless of the platform being used. For example, as shown in FIG. 5, a computer system (500) includes one or more processor(s) (502) (such as a central processing unit (CPU), integrated circuit, etc.), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer system (500) may also include input means, such as a keyboard (508), a mouse (510), or a microphone (not shown). Further, the computer system (500) may include output means, such as a monitor (512) (e.g., a liquid crystal display (LCD), a plasma display, or cathode ray tube (CRT) monitor), a printer, and/or audio speakers. The computer system (500) may be connected to a network (514) (e.g., a local area network (LAN), a wide area network (WAN), the Internet, or any other type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, in one or more embodiments of the invention, one or more elements of the aforementioned computer system (500) may be located at a remote location and connected to the other elements over a network. Further, embodiments of the invention may be implemented on a distributed system having a plurality of nodes, where each portion of the invention (e.g., FSE module (106), user application (110), etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a tangible computer readable storage medium, such as a compact disc (CD), a diskette, a tape, memory, or any other tangible computer readable storage device.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A method for enforcing a user specified minimum font size (USMFS) in a hardcopy document (HD), comprising:
   receiving a request to print an electronic document (ED) according to a magnification ratio;
   identifying, by a processor and within the ED, a first character having a first font size smaller than a quotient of the USMFS divided by the magnification ratio, a second character having a second font size exceeding the quotient, and a third character having a third font size;
   calculating, by the processor, a scale factor by dividing the quotient by the first font size;
   scaling, by the processor, the third font size by the scale factor; and
   increasing, by the processor, the first font size to match the quotient,
   wherein the HD is generated by scaling the ED by the magnification ratio after increasing the first font size and scaling the third font size, and
   wherein the HD comprises the first character in the USMFS and the second character in the second font size scaled by the magnification ratio.

2. The method of claim 1, further comprising:
   displaying, before identifying the first character, a graphical user interface (GUI) comprising a first widget accessible by a user; and
   collecting the USMFS from the first widget.

3. The method of claim 2, further comprising:
   collecting a request to calibrate from a second widget of the GUI; and
   printing, in response to the request to calibrate and before collecting the USMFS, a calibration page comprising a test string in the USMFS and the test string in a second font size.

4. The method of claim 1, further comprising:
   generating a plurality of page descriptor language (PDL) commands comprising a plurality of objects based on the ED,
   wherein identifying the first character comprises parsing the plurality of PDL commands, and
   wherein increasing the first font size comprises replacing the first font size with the quotient within the plurality of PDL commands.

5. The method of claim 4, wherein increasing the first font size is performed by a printer driver and wherein scaling the ED is performed by a printer.

6. The method of claim 1, further comprising:
   generating, by a print driver, a page image by rasterizing the ED; and
   sending, by the printer driver, the page image to the printer,
   wherein the page image comprises the first character in the USMFS.

7. The method of claim 1, further comprising:
   repositioning a text block of the ED comprising the first character after increasing the first font size.

8. The method of claim 1, wherein the magnification ratio corresponds to an N-up printing feature.

9. A method for enforcing a user specified minimum font size (USMFS) in a hardcopy document (HD), comprising:
   receiving, by a printer, a print job identifying a magnification ratio and comprising a plurality of page descriptor language (PDL) commands corresponding to an electronic document (ED);
   identifying, by the printer and within the plurality of PDL commands, a first character in the ED having a first font size smaller than a quotient of the USMFS divided by the magnification ratio, a second character in the ED having a second font size exceeding the quotient, and a third character in the ED having a third font size;

calculating, by the printer, a scale factor by dividing the quotient by the first font size;

replacing, by the printer and within the plurality of PDL commands, the third font size with a product of the third font size and the scale factor;

replacing, by the printer and within the plurality of PDL commands, the first font size with the quotient of the USMFS divided by the magnification ratio, wherein the first font size is smaller than the quotient; and generating, by the printer and based on the plurality of PDL commands, the HD by scaling the ED by the magnification ratio after replacing the first font size with the quotient and the third font size with the product, wherein the HD comprises the first character in the USMFS and the second character in the second font size scaled by the magnification ratio.

10. The method of claim 9, wherein the magnification ratio corresponds to an N-up printing feature.

11. A computer readable storage medium storing instructions for enforcing a user specified minimum font size (USMFS) in a hardcopy document (HD), the instructions comprising functionality to:

receive a request to print an electronic document (ED) according to a magnification ratio;

identify, with the ED, a first character having a first font size smaller than a quotient of the USMFS divided by the magnification ratio, a second character having a second font size exceeding the quotient, and a third character having a third font size;

calculate a scale factor by dividing the quotient by the first font size;

scale the third font size by the scale factor; and increase the first font size to match the quotient, wherein the HD is generated by scaling the ED by the magnification ratio after the first font size is increased and the third font size is scaled, and wherein the HD comprises the first character in the USMFS and the second character in the second font size scaled by the magnification ratio.

12. The computer readable storage medium of claim 11, wherein the magnification ratio corresponds to an N-up printing feature.

13. The computer readable storage medium of claim 11, the instructions further comprising functionality to:

generate, by a print driver, a page image by rasterizing the ED; and send, by the printer driver, the page image to the printer, wherein the page image comprises the first character in the USMFS.

14. The computer readable storage medium of claim 11, the instructions further comprising functionality to:

display, before the first character is identified, a graphical user interface (GUI) comprising a first widget accessible by a user; and collect the USMFS from the first widget.

15. The computer readable storage medium of claim 14, the instructions further comprising functionality to:

collect a request to calibrate from a second widget of the GUI; and print, in response to the request to calibrate and before the USMFS is collected, a calibration page comprising a test string in the USMFS and the test string in a second font size.

16. The computer readable storage medium of claim 11, the instructions further comprising functionality to:

generate a plurality of page descriptor language (PDL) commands comprising a plurality of objects based on the ED, wherein the first character is identified by parsing the plurality of PDL commands, and wherein the first font size is increased by replacing the first font size with the quotient within the plurality of PDL commands.

17. The computer readable storage medium of claim 16, wherein the first font size is increased by a printer driver and wherein the ED is scaled by a printer.

18. A system for enforcing a user specified minimum font size (USMFS) in a hardcopy document (HD), comprising:

a hardware processor;

a memory operatively connected to the hardware processor; and a plurality of instructions stored within the memory and comprising functionality to:

receive a request to print an electronic document (ED) according to a magnification ratio;

identify, within the ED, a first character having a first font size smaller than a quotient of the USMFS divided by the magnification ratio, a second character having a second font size exceeding the quotient, and a third character having a third font size;

calculate a scale factor by dividing the quotient by the first font size;

scale the third font size by the scale factor; and increase the first font size to match the quotient, wherein the HD is generated by scaling the ED by the magnification ratio after the first font size is increased and the third font size is scaled, and wherein the HD comprises the first character in the USMFS and the second character in the second font size scaled by the magnification ratio.

19. The system of claim 18, wherein the magnification ratio corresponds to an N-up printing feature.

* * * * *